US009600444B2

(12) United States Patent
Ota

(10) Patent No.: US 9,600,444 B2
(45) Date of Patent: Mar. 21, 2017

(54) METHOD FOR GENERATING INFORMATION SIGNAL

(71) Applicant: CANON KABUSHIKI KAISHA, Tokyo (JP)

(72) Inventor: Takefumi Ota, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 13/721,403

(22) Filed: Dec. 20, 2012

(65) Prior Publication Data

US 2013/0166239 A1 Jun. 27, 2013

(30) Foreign Application Priority Data

Dec. 27, 2011 (WO) .................. PCT/JP2011/080223

(51) Int. Cl.
*G06F 17/14* (2006.01)
*G01B 9/02* (2006.01)
(Continued)

(52) U.S. Cl.
CPC ......... *G06F 17/14* (2013.01); *G01B 9/02084* (2013.01); *G01B 9/02091* (2013.01);
(Continued)

(58) Field of Classification Search
CPC . G01B 9/02084; G01B 9/02091; G06F 17/14; G06T 5/10; G06T 5/002; G06T 2207/20056; G06T 2207/10101
(Continued)

(56) References Cited

U.S. PATENT DOCUMENTS

| 5,686,922 A | 11/1997 | Stankwitz et al. |
| 6,252,668 B1 * | 6/2001 | Hill ..................... G03F 7/70775 356/450 |

FOREIGN PATENT DOCUMENTS

| GB | WO 2011010092 A1 * | 1/2011 | ......... G01B 11/2441 |
| JP | S61-111427 A | 5/1986 | |

(Continued)

OTHER PUBLICATIONS

Huntley,JM. An Image Processing system for the analysis of speckle photographs., JPhys E:Sci Instrum 9 , 1986.*
(Continued)

*Primary Examiner* — Gregory J Toatley
*Assistant Examiner* — Yoshihisa Ishizuka
(74) *Attorney, Agent, or Firm* — Canon USA Inc., IP Division

(57) ABSTRACT

A signal generation method for generating an information signal F(b) by performing a Fourier transform on a signal f(a) includes the following steps: detecting the maximum peak intensity of the information signal F(b); calculating an amplitude, a phase, and a frequency of the signal f(a) corresponding to the maximum peak intensity; generating a signal by causing the signal f(a) corresponding to the maximum peak intensity to extend along an 'a' axis on the basis of information about the amplitude, the phase, and the frequency of the signal f(a); generating an extrapolation signal by extracting a signal in a region smaller than a1 and a signal in a region larger than a2 from the signal, where a1<a2; generating a composite signal by combining the extrapolation signal with the signal f(a) in a range from a1 to a2; and performing a Fourier transform on the composite signal.

10 Claims, 7 Drawing Sheets

(51) Int. Cl.
*G06T 5/00* (2006.01)
*G06T 5/10* (2006.01)

(52) U.S. Cl.
CPC ............ *G06T 5/002* (2013.01); *G06T 5/10* (2013.01); *G06T 2207/10101* (2013.01); *G06T 2207/20056* (2013.01)

(58) Field of Classification Search
USPC .......... 324/196, 76.21; 702/77, 70; 342/195, 342/379; 356/497
See application file for complete search history.

(56) References Cited

FOREIGN PATENT DOCUMENTS

| | | |
|---|---|---|
| JP | 63302307 A | 12/1988 |
| JP | H09-288006 A | 11/1997 |
| JP | 10510355 A | 10/1998 |
| JP | 2001008919 A | 1/2001 |
| JP | 2008216381 A | 9/2008 |
| JP | 2008298767 A | 12/2008 |
| JP | 2009-250709 A | 10/2009 |
| JP | 2009536740 A | 10/2009 |
| JP | 2010223670 A | 10/2010 |
| TW | 201120407 A | 6/2011 |

OTHER PUBLICATIONS

Heinzel, G. Spectrum and spectral density estimation by the Discrete Fourier transform (DFT), including a comprehensive list of window functions and some new flat-top windows., Max-Planck-Institut, Feb. 15, 2002.*
Stankwitz, H.C., et al., "Sparse Aperture Fill for SAR Using Super-SVA", IEEE, May 13, 1996, pp. 70-75.
Hsu, I-J, et al., "Process Algorithms for Resolution Improvement and Contrast Enhancement in Optical Coherence Tomography", Optical Review, 2003, pp. 567-571, vol. 10, No. 6.
Manojlovic, L., "Novel Method for Optical Coherence Tomography Resolution Enhancement", IEEE Journal of Quantum Electronics, Mar. 2011, pp. 340-347, vol. 47, No. 3.
Suwa, K., et al., "A Bandwidth Extrapolation Technique for Improved Range Resolution of Polarmetric Radar Data", SICE, Aug. 5-7, 2002, pp. 2944-2948.

* cited by examiner

WAVE NUMBER

WAVE NUMBER ks    ke    WAVE NUMBER

WAVE NUMBER

SPACE

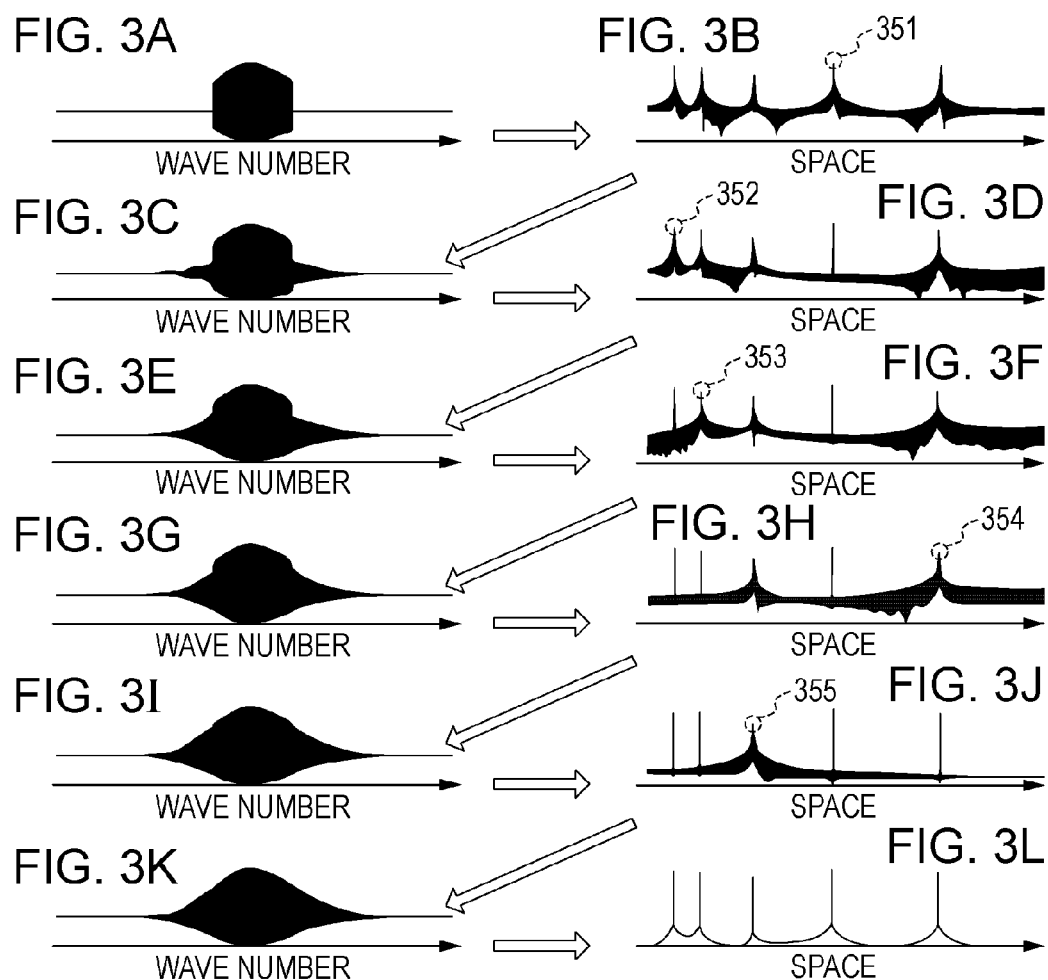

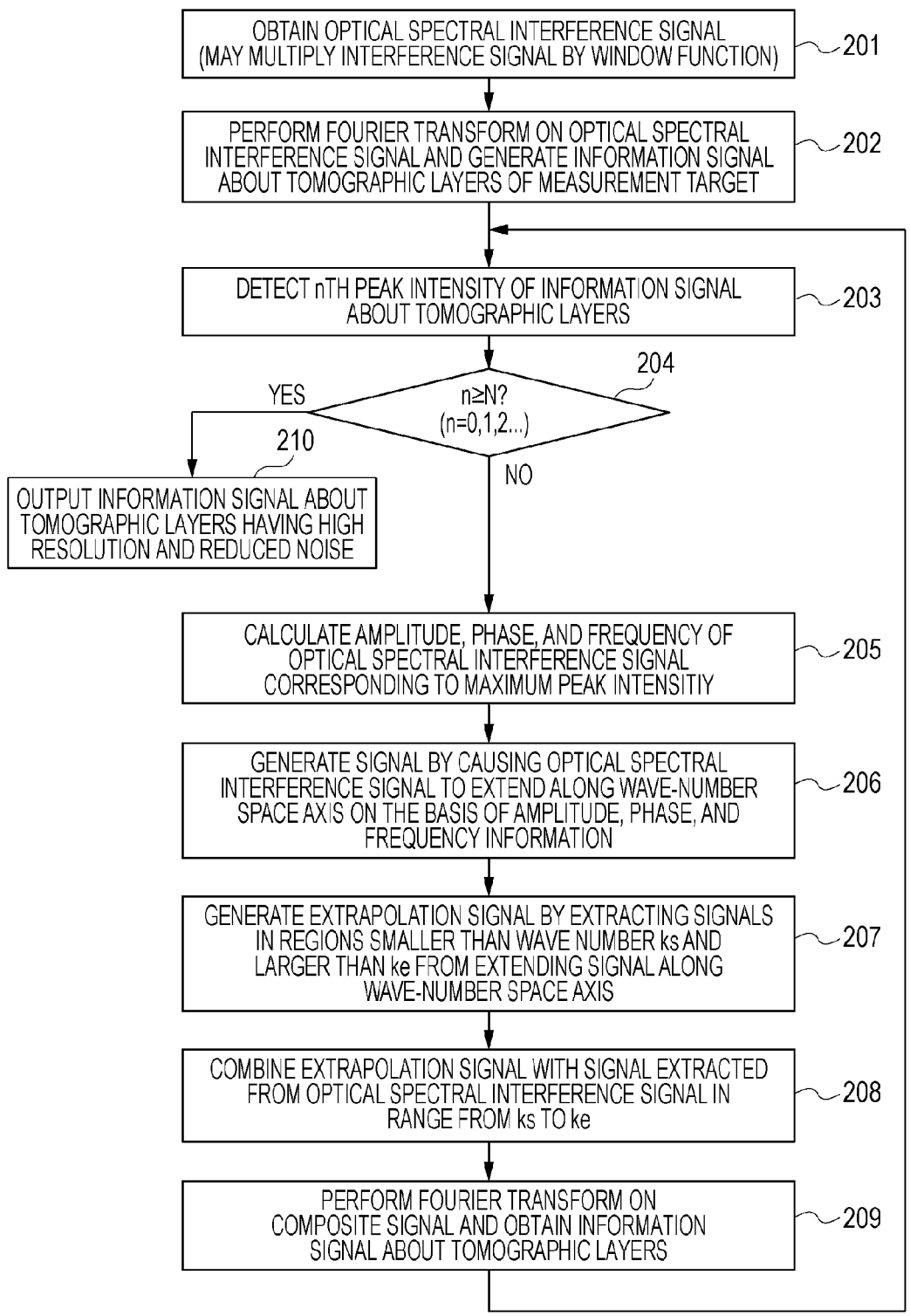

METHOD FOR GENERATING INFORMATION SIGNAL

TECHNICAL FIELD

The present invention relates to a signal generation method for generating an information signal by using a Fourier transform, such as a signal generation method for generating an information signal about a tomographic layer of a measurement target by obtaining an optical spectral interference signal and by performing a Fourier transform on the optical spectral interference signal.

BACKGROUND ART

Generation of various kinds of signals using a Fourier transform is widely performed, for example, in the image processing field, various kinds of measurement fields, and the audio analysis field.

For example, an optical coherence tomography imaging apparatus (Fourier Domain—Optical Coherence Tomography: FD-OCT) is used which obtains a tomographic information signal of a measurement target by performing a Fourier transform on an optical spectral interference signal.

In FD-OCT, light source output is divided into two or more beams, one of which is used as reference light and another of which is used as measurement light with which the measurement target is irradiated. Scattered or reflected light is returned back from the measurement target, and an optical spectral interference signal between the scattered or reflected light and the above-described reference light is obtained. The optical spectral interference signal is observed along the wave-number space axis, and a signal is obtained which vibrates along the wave-number space axis in accordance with the difference in optical path length between the reference light path and the measurement light path. Accordingly, the obtained optical spectral interference signal is subjected to a Fourier transform so that a tomographic information signal is obtained which indicates a peak in accordance with the difference in optical path length.

The intensity of the optical spectral interference signal is proportional to the product of the intensities of the reference light and the feedback light from the measurement target. Therefore, even when the feedback light from the measurement target is attenuated due to absorption, scattering, or transmission, a tomographic information signal of high sensitivity can be obtained.

A tomographic information signal obtained by performing a Fourier transform on an optical spectral interference signal represents the result of convolution calculation of a Fourier transform signal of a sine wave having a frequency based on the difference in optical path length and a shape obtained by performing a Fourier transform on the spectral shape.

Therefore, as the spectral band (e.g., depending on the wavelength band of the light source) is wider, a tomographic information signal having a higher resolution in the depth direction (ability to resolve a layer structure and display it) is obtained.

However, a spectral band is generally finite, and a spectral shape has a certain shape. Therefore, the shape of a tomographic information signal reflects the shape obtained by performing a Fourier transform on the spectral shape. Thus, degradation of a tomographic information signal occurs, such as in the case of an image display in which a tomographic layer which is originally one layer is displayed as multiple layers, a display in which multiple layers are not separated and are displayed as one layer, or a state in which a tomographic information signal of small intensity is buried at a tail of a tomographic information signal of large intensity.

Therefore, to suppress the degradation of a tomographic information signal, a method has been employed in which an obtained optical spectral interference signal is multiplied by a window function so that the waveform is shaped, in order to shape the tomographic information signal. This method causes a tomographic information signal to be made unimodal, and achieves suppression of noise. However, multiplication of a window function causes the optical spectral band to be narrowed, and causes the width of the tomographic information signal to be increased, resulting in degradation of the resolution in the depth direction of the tomographic image.

Such degradation of a signal is not limited to optical tomographic layer measurement, and is a common issue for signal processing or signal analysis processing accompanying a Fourier transform.

To solve the above-described issue, in the case of radar or the like, a method, for example, as in PTL 1 has been proposed which is called super spatially variant apodization and in which multiple extrapolations and resolution beyond the limits of diffraction are performed. In this method, a waveform is extracted in a wide band, the center of which is at a peak of a signal which is subjected to a Fourier transform, and an inverse Fourier transform is performed on the extracted waveform so that an extrapolation signal is generated. Then, the extrapolation signal is extrapolated to the original waveform so as to improve the resolution. By repeatedly performing this signal processing, a signal of higher resolution is obtained.

In the audio analysis-synthesis field as well, a method, for example, as in PTL 2, has been proposed in which frequency analysis is performed so that a signal is synthesized from the analysis result. In this method, only a main frequency component is extracted, and phase correction is performed so that sound is synthesized.

CITATION LIST

Patent Literature

PTL 1: U.S. Pat. No. 5,686,922
PTL 2: Japanese Patent Laid-Open No. 2008-216381

In the method described in PTL 1, a waveform is extracted in a wide band instead of near a peak. Therefore, in the case where a noise component is present in the extracted band, the noise component is also extracted as a signal, failing to reduce the noise level sufficiently.

In the method described in PTL 2, a nearby peak is removed, so that information to be originally present may be removed.

Thus, in these methods, the fact is that it is difficult to achieve an increase in resolution and a reduction of noise components of a signal at the same time.

SUMMARY OF INVENTION

The present invention provides a signal generation method for generating an information signal F(b) by performing a Fourier transform on a signal f(a). The signal generation method includes the following steps: detecting the maximum peak intensity of the information signal F(b); calculating an amplitude, a phase, and a frequency of the signal f(a) corresponding to the maximum peak intensity; generating a signal obtained by causing the signal f(a)

corresponding to the maximum peak intensity to extend along an 'a' axis on the basis of information about the amplitude, the phase, and the frequency of the signal f(a); generating an extrapolation signal by extracting a signal in a region smaller than a1 and a signal in a region larger than a2 from the signal, where a1<a2; generating a composite signal by combining the extrapolation signal with the signal f(a) in a range from a1 to a2; and performing a Fourier transform on the composite signal.

Further features of the present invention will become apparent from the following description of exemplary embodiments with reference to the attached drawings.

BRIEF DESCRIPTION OF DRAWINGS

FIGS. 3A to 3L are schematic diagrams for explaining repetitive processing in the present invention.

FIG. 4 is a flowchart for explaining repetitive processing in the present invention.

DESCRIPTION OF EMBODIMENTS

Figure 1A:
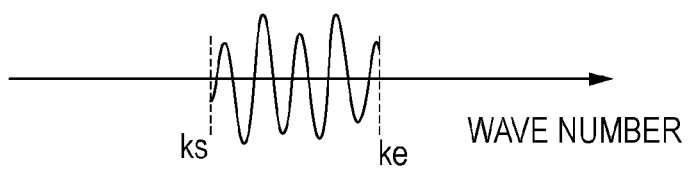
FIGS. 1A to 1D are schematic diagrams for explaining a process of a signal generation method of the present invention.

An information signal generation method of the present invention for generating an information signal F(b) by performing a Fourier transform on a signal f(a) includes the following steps.

That is, a step of detecting the maximum peak intensity of the information signal F(b). A step of calculating an amplitude, a phase, and a frequency of the signal f(a) corresponding to the maximum peak intensity. A step of generating a signal f'(a) by causing the signal f(a) corresponding to the maximum peak intensity to extend along an 'a' axis on the basis of the information about the amplitude, the phase, and the frequency. A step of generating an extrapolation signal by extracting a signal in a region smaller than a1 and a signal in a region larger than a2 from the extending signal, where a1<a2. A step of generating a composite signal by combining the extrapolation signal with the signal f(a) in a range from a1 to a2. A step of further performing a Fourier transform on the composite signal.

Additionally, the present invention includes repetitive processing in which the signal generation method is performed multiple times.

As the combination of f(a) and F(b) in the present invention, for example, the following combinations are employable: a combination of an optical spectral interference signal and a tomographic information signal in Fourier domain—optical coherence tomography (FD-OCT); a combination of an interference signal and a Spectroscopy information signal in Fourier transform infrared spectroscopy (FT-IR); a combination of an optical intensity signal and its analytic signal; and a combination of an audio signal and an audio analytic signal.

An embodiment of the present invention will be described in detail below taking FD-OCT as an example.

In FD-OCT, an obtained optical spectral interference signal I(k) is expressed in Expression (1).

$$I(k) \propto \sin(kx) \times S(k) \qquad \text{Expression (1)}$$

Here, k represents the wave number, x represents the difference in optical path length between the reference light path and the measurement light path, and S(k) represents a spectral shape.

Consequently, a tomographic information signal which is obtained by performing a Fourier transform on an optical spectral interference signal expressed in Expression (1) is expressed as follows.

$$FT[\sin(kx) \times S(k)] = FT[\sin(kx)] \otimes FT[S(k)] \qquad \text{Expression (2)}$$

This indicates that a tomographic information signal represents the result of convolution calculation of a Fourier transform signal of a sine wave having a frequency based on the difference in optical path length and a shape obtained by performing a Fourier transform on the spectral shape. Therefore, as the spectral band (e.g., depending on the wavelength band of the light source) is wider, a tomographic information signal having a higher resolution in depth direction (ability to resolve a layer structure and display it) is obtained.

However, a spectrum generally does not have an infinite broad band, and has a certain shape S(k). Accordingly, the shape of a tomographic information signal reflects the Fourier transform shape obtained from the spectral shape.

Thus, in the present invention, attention is focused on a sine wave component of an obtained interference signal, and a tomographic information signal which is independent of the spectral shape can be obtained by using the signal generation method as described below.

For example, in the present invention, an extrapolation signal is generated in a broad band so as to be multiplied by a window function in a broad band. Therefore, the width of a tomographic information signal corresponding to a peak intensity to which the extrapolation signal is extrapolated is narrowed, resulting in an increase in the resolution of an information signal about a tomographic layer.

For example, in the case where a Gaussian window is multiplied so that a Fourier transform is performed, the resolution $\Delta z$ of a tomographic information signal is expressed in Expression (3).

$$\Delta z = \frac{2\ln(2)}{\pi} \cdot \frac{\lambda_c^2}{\Delta \lambda} \qquad \text{Expression (3)}$$

Here, $\lambda_c$ represents the center wavelength of the Gaussian window, and $\Delta\lambda$ represents a full width at half maximum in the Gaussian window.

Figure 5:
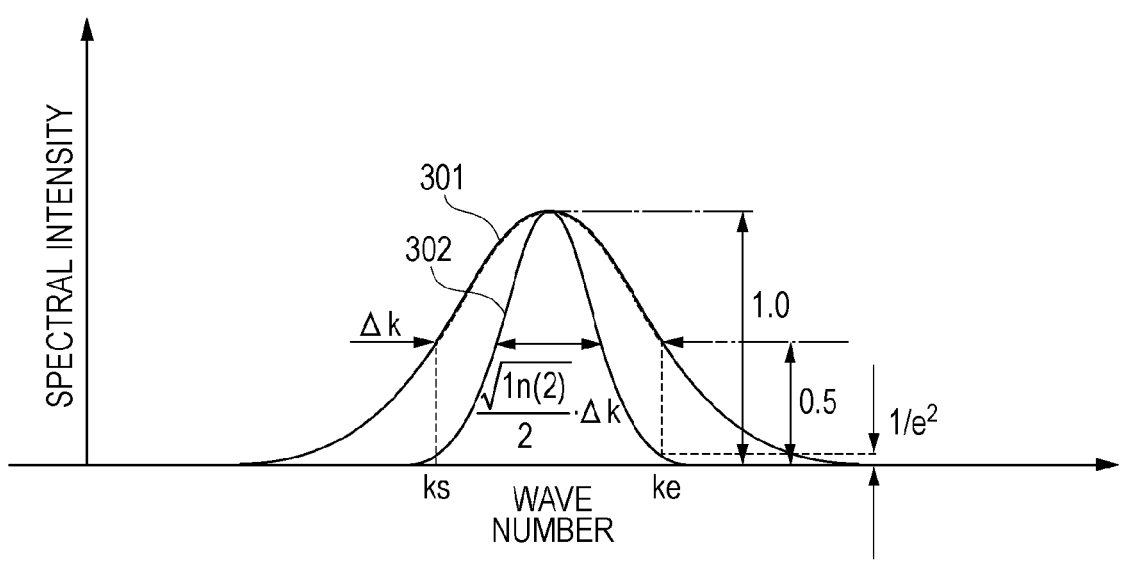
FIG. 5 is a schematic diagram for explaining an effect of a window function.

An effect of the present invention will be described with reference to FIG. 5. In FIG. 5, a spectrum 301 indicates one obtained using the method of the present invention. The spectrum 301 is obtained by adding an extrapolation signal in regions other than a region of the wave number from ks to ke, which indicates a spectral band of the light source, i.e., in regions smaller than ks and larger than ke.

More specifically, the spectrum is obtained by multiplying it by a Gaussian window which causes the value to become one half at the ends of the spectral band (ks and ke) of the light source output due to the extrapolation signal, and performing a Fourier transform.

A spectrum 302 indicates one which corresponds to the related art and to which the present invention is not applied. The spectrum 302 is obtained by multiplying it by a Gaussian window in which the value reaches $1/e^2$ at the ends of the spectral band of the light source output, and performing a Fourier transform on it.

Comparing the spectrum 301 with the spectrum 302, the full width at half maximum Δk of the spectrum 301 of the present invention is approximately 2.4 times wider than that of the spectrum 302, whereby the resolution of the spectrum 301 is approximately 2.4 times higher.

An extrapolation signal is added in a broad band, whereby a window function can be multiplied in a broad band. Accordingly, side noise can be reduced around a tomographic information signal corresponding to a peak intensity to which an extrapolation signal is extrapolated.

Noise reduction in a signal which is obtained using the method of the present invention will be described with reference to FIGS. 6A to 6D.

Figure 6A:
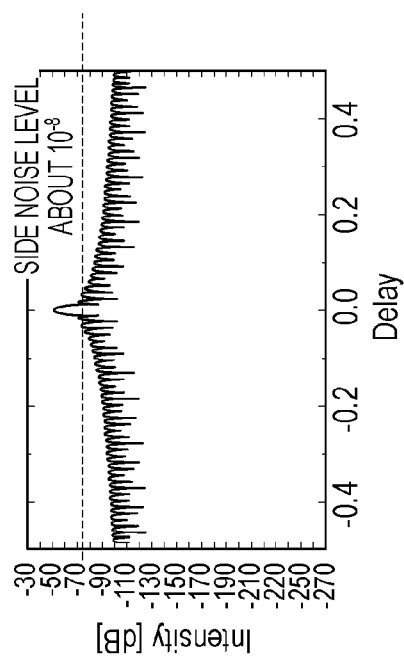
FIGS. 6A to 6D are graphs for explaining an effect of the present invention.
Figure 6B:
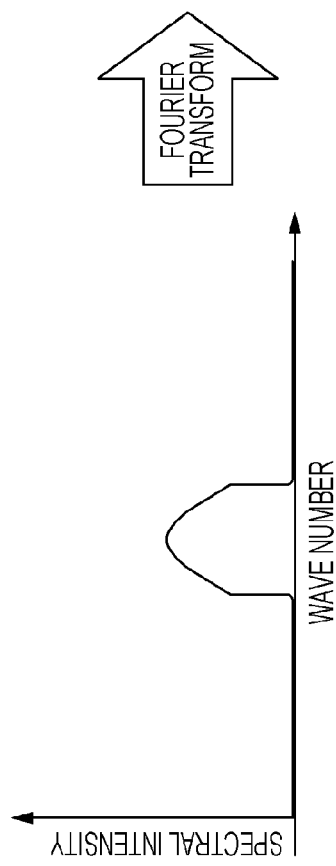

FIG. 6A illustrates a signal spectrum which corresponds to the related art and to which the present invention is not applied (a Gaussian function in which the value reaches 0 at half the maximum). FIG. 6B illustrates a signal obtained by performing a Fourier transform on the signal spectrum.

Figure 6C:
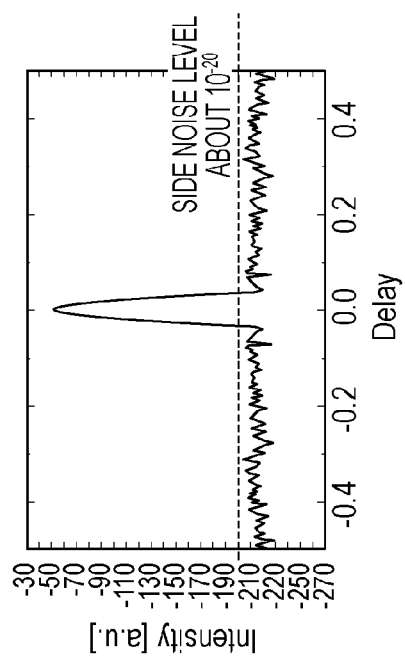
Figure 6D:
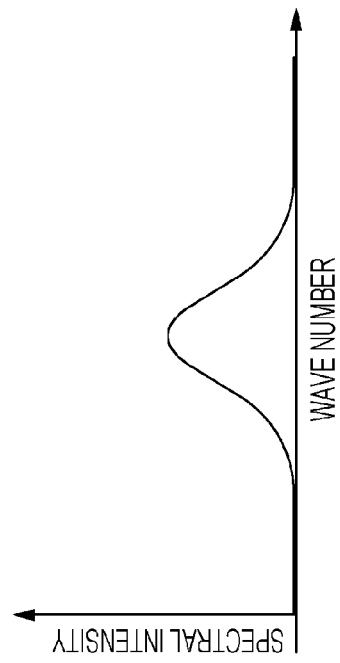

FIG. 6C illustrates a signal spectrum to which the present invention is applied. FIG. 6D illustrates a signal obtained by performing a Fourier transform on the signal spectrum.

As illustrated in FIG. 6C, an extrapolation signal can be extrapolated in a range in which the values at the tails of the window function become sufficiently small. As illustrated in FIG. 6D, the level of signal noise (side noise) obtained through a Fourier transform can be reduced, for a certain peak intensity value, to a level in which the signal noise is smaller by ten orders of magnitude or more. The wider the extended range is, the smaller the noise is.

In the case where the extension is performed in a range in which the value of the Gaussian window function becomes $1/e^2$, the noise level is improved approximately by one order of magnitude. In the case where the extension is performed in a range in which the value of the Gaussian window function reaches 0.001, the noise level is improved approximately by twelve orders of magnitude.

In contrast, a wider extended range results in an increase in data amount, causing the signal processing to take more time. Therefore, it is necessary to determine a finite extension range.

In OCT, a signal-to-noise ratio (SNR) of an image is desirably 96 dB or more. Accordingly, an extension width is determined so that an SNR is a noise level which is more than 96 dB.

Processes in the signal generation method of the present invention will be specifically described below with reference to FIGS. 1A through 2E.

FIG. 1A illustrates an optical spectral interference signal obtained by using a light source whose spectral band is from the wave number ks to ke. Description about this will be made using an example. Light is emitted from a light source which has a broad band in terms of the number of emission waves or from a light source in which the number of emission waves is temporally changed over a broad band, and the light is divided into at least two beams. Then, interference occurs between scattered or reflected light obtained from a measurement target by irradiating the measurement target with one of the beams, and the other beam. The optical spectral interference signal thus obtained is illustrated.

Figure 1B:
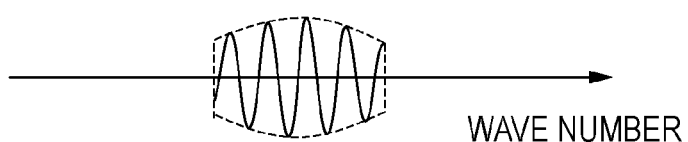

FIG. 1B illustrates a signal obtained by multiplying the optical spectral interference signal in FIG. 1A by a window function for shaping the envelope. This process is optional in the present invention, and is performed as necessary.

Figure 1C:
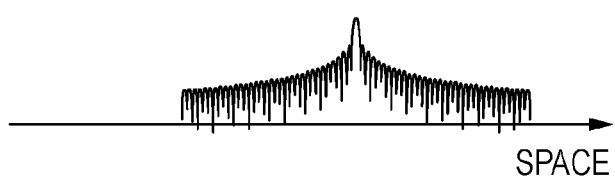

FIG. 1C illustrates an information signal about a tomographic layer in the measurement target, which is obtained by performing a Fourier transform on the optical spectral interference signal in FIG. 1B. Here, the example is illustrated in which a signal multiplied by a window function is subjected to a Fourier transform. The present invention also includes a case where the interference signal in FIG. 1A which is not multiplied by a window function is subjected to a Fourier transform.

Figure 1D:
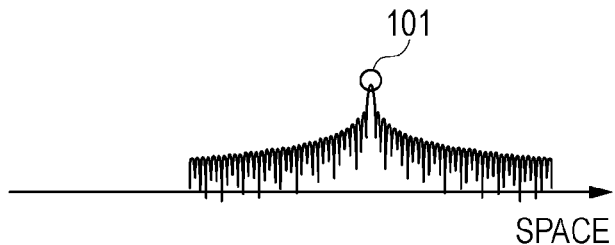

As illustrated in FIG. 1D, a maximum 101 of peak intensities is detected from the information signal.

Figure 2A:
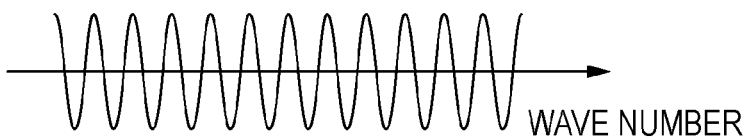
FIGS. 2A to 2E are schematic diagrams for explaining a process of a signal generation method of the present invention.
Figure 2B:
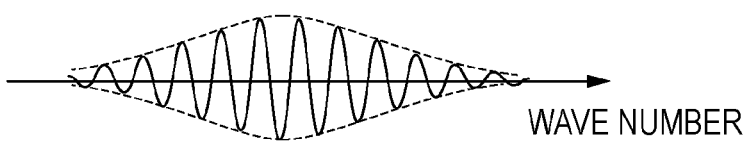
Figure 2C:
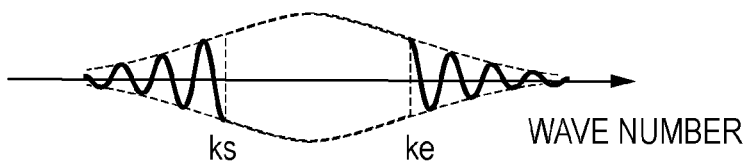
Figure 2D:
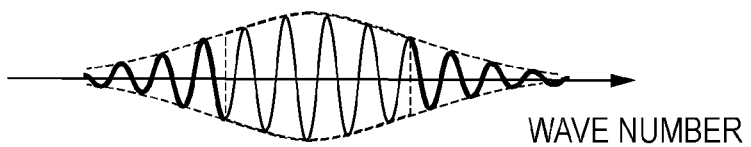

The amplitude, the phase, and the frequency of the optical spectral interference signal which corresponds to the maximum 101 of the peak intensities are calculated. As illustrated in FIG. 2A, a signal is generated in which the optical spectral interference signal corresponding to the maximum 101 of the peak intensities extends along the wave-number space axis on the basis of the information about the amplitude, the phase, and the frequency. Then, a signal illustrated in FIG. 2B is obtained by multiplying the extending signal (FIG. 2A) by a window function. However, this process is optional in the present invention, and is performed as necessary.

Then, an extrapolation signal (FIG. 2C) is generated by extracting a signal in the range smaller than the wave number ks and a signal in the range larger than the wave number ke from a signal which is multiplied by the window function, where ks and ke are present in the wave-number band of the light emitted from the light source and where ks<ke.

A composite signal (FIG. 2D) is generated by combining the extrapolation signal with an extracted signal obtained by extracting a signal in the range from the wave number ks to the wave number ke from the optical spectral interference signal.

Figure 2E:
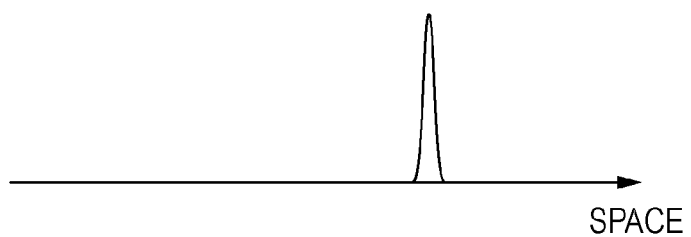

The obtained composite signal is further subjected to a Fourier transform (FIG. 2E).

The information signal illustrated in FIG. 2E has a spectrum width narrower than that of the information signal illustrated in FIG. 1C, achieving significant suppression of noise.

Thus, it is understood that, using the sequence of processes described above, the maximum of the peak intensities is detected, enabling correct detection of only a tomographic information signal and suppression of side noise components.

In embodiments in which the signal generation method of the present invention is applied to a method for generating an information signal about a tomographic layer, the present invention includes a signal generation method including the following steps.

That is, a step of detecting the maximum peak intensity of an information signal about a tomographic layer, in which the signal f(a) represents an optical spectral interference signal, and the information signal F(b) represents the information signal about a tomographic layer.

A step of calculating an amplitude, a phase, and a frequency of the optical spectral interference signal corresponding to the maximum peak intensity of the information signal about the tomographic layer.

A step of generating a signal extending along the wave-number axis on the basis of the information about the amplitude, the phase, and the frequency, in which the wave-number axis serves as the 'a' axis.

A step of generating an extrapolation signal by extracting a signal in the region smaller than the wave number ks and a signal in the region larger than the wave number ke from the extending signal, where ks<ke.

A step of generating a composite signal by combining the extrapolation signal with an optical spectral interference signal in a range from the wave number ks to ke. Finally, a step of further performing a Fourier transform on the composite signal.

In the present invention, in the case where a spectral shape in the spectral band from ks to ke of the extracted signal is significantly different from that of an ideal window function, a tomographic information signal is made unimodal by shaping the spectral shape, improving the image quality of the tomographic image.

Description will be made with reference to FIGS. 3A and 4 about a method for increasing the sensitivity and the resolution over the entire tomographic information signal by repeatedly generating a useful extrapolation signal and obtaining a composite waveform in the case where a specimen to be measured has multiple layers. The method enables detection of a small tomographic information signal which is buried in side noise components.

As illustrated in FIG. 4, an optical spectral interference signal is first obtained (201). It is preferable to record the obtained interference signal at regular wave-number intervals, or to perform data conversion through signal processing so as to obtain data at regular wave-number intervals. The envelope of the interference signal matches the spectral intensity of the light source output. Therefore, the spectral intensity of the light source output, which is otherwise obtained, can be used to convert the envelope of the interference signal into a flat-top shape and shape it into a rectangular waveform. In addition, the interference signal shaped into a rectangular waveform can be multiplied by a window function. The window function may be multiplied when necessary.

Then, an information signal about tomographic layers in the measurement target is obtained by performing a Fourier transform on the interference signal (202).

The peak having the nth value of the peak intensities is detected from the obtained information signal about the tomographic layers (203).

The present invention includes a process in which generation of an extrapolation signal, generation of a composite signal, and a Fourier transform are repeatedly performed a predetermined number N of times in accordance with the maximum of the peak intensities of the obtained information signal (e.g., an information signal about tomographic layers).

If the nth peak detection (here, n is an integer equal to or more than 1) does not correspond to the predetermined number N (NO at 204), an amplitude, a phase, and a frequency are calculated which correspond to the value of the nth detected peak intensity (205). If the nth peak detection does correspond to the predetermined number N (YES at 204), the flow process advances to step 210 to perform an output operation. The nth peak intensity indicates a vibration signal in an interference signal which vibrates at a frequency based on the difference in optical path length between the reference light path and the measurement light path. A vibration waveform is generated which extends to and over the wave-number band in which the extrapolation is performed (extends along the wave-number space axis), on the basis of the calculated information about the amplitude, the phase, and the frequency (206).

When a window function is used, a process of multiplying the extending signal by the window function may be added. An extrapolation signal is generated by extracting a signal in the range smaller than the wave number ks and a signal in the range larger than the wave number ke from the signal extending along the wave-number space axis (or from the signal multiplied by the window function) (207).

A composite signal is generated by combining the extrapolation signal with an extracted signal obtained by extracting a signal in the range from the wave number ks to the wave number ke from the optical spectral interference signal (208).

A tomographic information signal is obtained by performing a Fourier transform on the composite signal (209).

By performing the processes as described above, the resolution of the signal corresponding to the detected peak intensity is increased, and side noise components around the peak intensity are suppressed.

The steps 203 to 209 described above are repeatedly performed in descending order of peak intensity value from the first to the Nth peak intensity.

In step 203, only signal components which are distinguished from noise are extracted. Therefore, by performing steps 201 to 209, and 210, side noise components which occur depending on the light source spectral band are suppressed, enabling a high-resolution and high-sensitivity tomographic information signal to be obtained.

FIG. 3A illustrates a spectral interference signal. FIG. 3B illustrates an information signal obtained by performing a Fourier transform on the optical spectral interference signal. A maximum 351 in FIG. 3B is the maximum of the peak intensities of the information signal (step 203 in FIG. 4). The maximum 351 indicates the first peak value in terms of the nth peak value.

FIG. 3C illustrates a composite signal using a signal (extrapolation signal) extending along the wave-number space axis on the basis of the amplitude, the phase and the frequency of the optical spectral interference signal corresponding to the maximum 351 of the peak intensities (step 208 in FIG. 4).

FIG. 3D illustrates an information signal obtained by performing a Fourier transform on the composite signal, and a peak intensity 352 indicates the second peak intensity of the information signal obtained through the first Fourier transform. The peak intensity 352 corresponds to the second peak value in terms of the (n+1)th peak value. The similar processes are performed on the second peak intensity 352.

FIG. 3E illustrates a composite signal using a signal (extrapolation signal) extending along the wave-number space axis on the basis of the amplitude, the phase and the frequency of the optical spectral interference signal corresponding to the second peak intensity 352 of the peak intensities. FIG. 3G illustrates a composite signal using a signal (extrapolation signal) extending along the wave-number space axis on the basis of the amplitude, the phase and the frequency of the optical spectral interference signal corresponding to the third peak intensity 353. FIG. 3I illustrates a composite signal using a signal (extrapolation signal) extending along the wave-number space axis on the basis of the amplitude, the phase and the frequency of the optical spectral interference signal corresponding to the fourth peak intensity 354. FIG. 3K illustrates a composite signal using a signal (extrapolation signal) extending along the wave-number space axis on the basis of the amplitude, the phase and the frequency of the optical spectral interference signal corresponding to the fifth peak intensity 355.

A peak intensity 353 in FIG. 3F, a peak intensity 354 in FIG. 3H, and a peak intensity 355 in FIG. 3J indicate the third, fourth, and fifth peak intensities of the information signal obtained through the first Fourier transform, respectively. As understood in comparison between FIGS. 3B and 3L, the repetitions of the Fourier transform cycle of the present invention achieve an information signal in which noise components are significantly suppressed.

Additionally, the repetitions of the signal processing on an information signal in descending order of peak intensity causes correct extraction of a tomographic information signal which is buried in side noise, enabling the resolution and the sensitivity to be increased over the entire information signal about tomographic layers.

The predetermined number N may be interpreted as the number of peaks in the information signal about the tomographic layers. When a signal is generated in this viewpoint, the minimum number of repetitions enables the resolution and the sensitivity to be increased over the entire information signal about tomographic layers. When the number of peaks N is unknown, N may be set to the number of peaks obtained by counting detected peaks in descending order of intensity until a peak equal to or smaller than a predetermined intensity is detected. Thus, an increase in the resolution and the sensitivity of signals about tomographic layers each having a certain value or more, can be achieved without performing an infinite number of repetitions of computation.

Alternatively, a method is employable in which a threshold is set to detect peaks equal to or more than the threshold, instead of repeatedly performing processes including the Fourier transform N times in descending order of peak intensity value.

In this method, for example, the following processes may be performed.

(a) The obtained interference signal is recorded at regular wave-number intervals, or is converted into pieces of data at regular wave-number intervals through signal processing.

(b) The envelope of the interference signal matches the spectral intensity of the light source output. Therefore, the spectral intensity of the light source output, which is otherwise obtained, is used to convert the envelope of the interference signal into a flat-top shape and shape it into a rectangular waveform.

(c) The interference signal shaped into a rectangular waveform is multiplied by a window function.

(d) An information signal about tomographic layers in the measurement target is obtained by performing a Fourier transform on the interference signal which is multiplied by the window function.

(e) The maximum peak value is detected from the obtained information signal about the tomographic layers. The mth threshold is set to a value obtained by multiplying the maximum peak value by a predetermined ratio m times. All peaks having a peak intensity equal to or more than the mth threshold are detected.

(f) Each of the peak intensities equal to or more than the mth threshold represents a vibration signal in an interference signal which vibrates at a frequency based on the difference in optical path length between the reference light path and the measurement light path. Accordingly, the amplitude, the phase, and the frequency which correspond to the value of each of the detected peak intensities are calculated.

(g) A corresponding vibration waveform is generated in the wave-number band in which extrapolation is to be performed, on the basis of each of calculated pieces of information about the amplitude, the phase, and the frequency, and an extrapolation signal is obtained by adding the generated vibration waveforms.

(h) The extrapolation signal is multiplied by the window function.

(i) A signal in the region smaller than the wave number ks and a signal in the region larger than the wave number ke are extracted from the extrapolation signal multiplied by the window function.

(j) A composite signal is generated by extrapolating the extracted extrapolation signals to the interference signal multiplied by the window function.

(k) A tomographic information signal is obtained by performing a Fourier transform on the composite signal. By performing the processes as described above, the resolution of the signal at the detected peak intensities is increased, and side noise components around the peak intensities are suppressed.

(l) The operations (e) to (k) are repeatedly performed by reducing the threshold by the predetermined ratio and incrementing m by 1 from 1 to M.

Peaks having a value equal to or more than the threshold are collectively detected, and an extrapolation signal is generated for all the detected peaks so as to be extrapolated to the original signal, achieving a reduction in the number of computations and a high-speed signal generation method.

The predetermined number M is determined in advance in the signal generation process (l). Alternatively, the repetitions may be performed until the number of detected peaks reaches a predetermined number, instead of setting the number of repetitions to M. This enables the number of computations to be limited. Instead, the repetitions may be performed until the threshold becomes equal to or less than a predetermined value. This enables the resolution and the sensitivity to be increased over the entire signal about tomographic layers having a value equal to or more than a certain value without performing an infinite number of repetitions of the computation.

The predetermined ratio used to reduce the threshold may be the ratio between the maximum and the second peak value of the intensity of a signal which is obtained by acquiring the envelope waveform of an interference signal and performing a Fourier transform on the envelope waveform. This enables the predetermined ratio used to reduce the threshold to be the maximum, and enables the threshold to be efficiently reduced.

The signal generation method of the present invention includes an embodiment in which a signal f(a) is multiplied by a window function in which the value reaches 0 at the tails of the waveform indicated by the function, and in which a signal extends to a point 'a' at which the value of the window function reaches 0.

Additionally, an embodiment is included in which the range in which the signal f(a) is to extend matches or includes a range in which the ratio between the maximum peak value and the second peak value of the intensity of a signal obtained by performing a Fourier transform on the window function in the extended range becomes a predetermined value.

Further, the signal f(a) may be obtained by dividing the signal f(a) by the envelope information of the signal f(a) so as to convert the shape of the signal f(a) into a flat-top shape and multiplying the resulting signal f(a) by a window function.

In the signal generation method of the present invention, an extrapolation signal is repeatedly generated and extrapolated in descending order of the peak intensity value of an information signal, so that side noise components which are proportional to peak intensity values are sequentially suppressed. Since the suppressed side noise components accompany the detected peaks, the information signal buried in the side noise is not deleted. Therefore, only the information signal is correctly extracted by suppressing side noise components in sequence in descending order of peak intensity value of the information signal, enabling noise components over the entire information signal to be suppressed.

The processing which is repeatedly performed on an information signal in descending order of peak intensity value results in a large number of computations and a long period of the time for generating a signal. Accordingly, a threshold is set to collectively detect peaks having a value equal to or more than the threshold. An extrapolation signal is generated for each of all the detected peaks, and is extrapolated to the original signal, achieving a reduction of the number of computations and a hi-speed signal generation method.

Many correct peaks of an information signal can be detected at one time by setting the threshold to a value as small as possible. However, a too-small threshold causes side noise to be also detected as an information signal. On the other hand, the magnitude of side noise is determined by a waveform obtained by performing a Fourier transform on the shape of the envelope of the original signal. Therefore, a ratio between the maximum peak value and the second peak value of the peak intensities is calculated in the waveform obtained by performing a Fourier transform on the shape of the envelope, and the threshold is set to a value obtained by multiplying the ratio by the maximum peak intensity of the actually obtained information signal. Accordingly, side noise components can be avoided, and peak intensities regarding an information signal can be correctly detected.

In the present invention, the spectral band can be widened by using an extrapolation signal infinitely in theory. However, an infinite spectral band results in too many pieces of data and too much time taken for a process such as a Fourier transform. The shape of an information signal reflects a waveform obtained by performing a Fourier transform on the shape of the envelope of the original signal. Therefore, the shape of an information signal is shaped generally by multiplying the original signal by a window function, such as the cos function, a Hanning function, or a Gaussian function, which is symmetrical and in which the value comes close to 0 at a tail. Accordingly, the range of an extrapolation signal extends to and over a range in which the value of the window function sufficiently comes close to 0 at a tail. Therefore, the number of pieces of data can be limited, achieving high-speed processing with an increase in the resolution and a reduction of noise in an information signal.

In the case where the shape of the envelope of the original signal is not a flat-top shape, even if the original signal is directly multiplied by a window function, an influence of the shape of the envelope of the original signal still remains, and the influence is also exerted on the information signal. Accordingly, the optical spectral interference signal is divided by the envelope-shape information, so that the signal has a flat-top shape. Thus, an influence of the shape of the envelope of the original signal can be suppressed, and a window function can be used for shaping.

The present invention includes an information signal processing apparatus which generates an information signal F(b) by performing a Fourier transform on a signal f(a). This information signal processing apparatus includes the following.

That is, a processor that detects the maximum peak intensity in the information signal F(b). A processor that calculates an amplitude, a phase, and a frequency of the signal f(a) corresponding to the maximum peak intensity of the information signal F(b). A processor that generates a signal extending along an 'a' axis on the basis of the information about the amplitude, the phase, and the frequency. A processor that generates an extrapolation signal by extracting a signal in the region smaller than a1 and a signal in the region larger than a2, from the extending signal, where a1<a2. A processor that generates a composite signal by combining the extrapolation signal with the signal f(a) in the range from a1 to a2. A processor that further performs a Fourier transform on the composite signal. These processors can be configured with an arithmetic apparatus for executing predetermined programs. Examples of the arithmetic apparatus include an arithmetic unit of a computer.

In addition, the present invention includes an optical coherence tomography imaging apparatus.

The optical coherence tomography imaging apparatus of the present invention includes a light source unit, a specimen measurement unit that emits light from the light source unit into a specimen and that conveys reflected light from the specimen, a reference unit that conveys light from the light source unit as reference light, an interference unit that causes interference between the reflected light and the reference light, a light detector that detects interference light from the interference unit, and an image processor that obtains a tomographic image of the specimen on the basis of the light detected by the light detector. The image processor includes a signal generation apparatus of the present invention.

First Embodiment

In the present embodiment, an exemplary optical coherence tomography imaging apparatus will be described which uses the signal generation method of the present invention.

Figure 7:
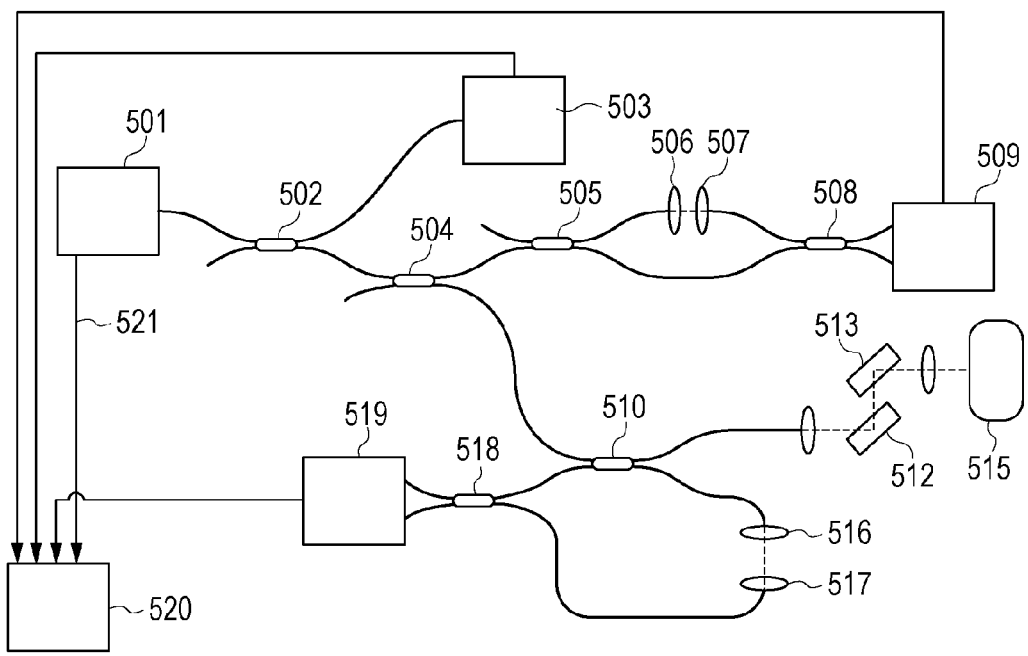
FIG. 7 is a schematic diagram of an optical coherence tomography imaging apparatus to which the present invention is applied.

The optical coherence tomography imaging apparatus according to the present embodiment is one using a wavelength-swept light source (Swept Source-Optical Coherence Tomography: SS-OCT) in the field of FD-OCT, and FIG. 7 is a schematic diagram illustrating the apparatus. In FIG. 7, the configuration of the apparatus uses optical fibers. However, a configuration may be employed which uses space instead of optical fibers.

The imaging apparatus (SS-OCT apparatus) illustrated in FIG. 7 uses a light source 501 (light source unit) which changes its emission wavelength from 800 nm to 880 nm over 10 µs. As the light source 501, for example, a light source is used which temporally changes a wavelength obtained by extracting a range of light from a broadband light source.

In the SS-OCT apparatus, light which is output from the light source 501 is divided into two beams by an optical fiber coupler 510, and one of the divided beams is used as measurement light with which a measurement target 515 is irradiated. The scattered or reflected light from the measurement target 515 is again coupled into the optical fiber coupler 510 (interference unit), and is propagated to an optical fiber coupler 518. At that time, the measurement light passes through a measurement light scanning optical system (specimen measurement unit) which includes two galvanometer mirrors 512 and 513 which are orthogonal to each other. The measurement light scanning optical system scans the measurement target 515 with the measurement light.

In contrast, the other divided beam is used as reference light which is propagated through, for example, a delay line (reference unit), and is propagated to an optical fiber coupler 518. The delay line is a space optical system in which a distance between an optical fiber end 516 on the irradiating side and an optical fiber end 517 on the entering side can be changed.

A differential light detector 519 (light detector) which causes interference between the scattered or reflected light and the reference light and which detects interference light obtains an optical spectral interference signal about a tomographic layer. The differential light detector 519 detects light at a response speed of 205 MHz. Therefore, optical spectrum interference data about 2050 points of a tomographic layer is output during one wavelength-swept operation by the SS-OCT apparatus. The optical spectrum interference data about a tomographic layer which has been output is received by a calculator 520 included in the image processor for obtaining a tomographic image, via an AD board.

Part of light which is output from the wavelength-swept light source is guided to a Mach-Zehnder interferometer by an optical fiber coupler 504. Differential light detection data for an optical spectral interference signal from the Mach-Zehnder interferometer intersects a point of 0 at regular wave-number intervals. Therefore, the differential light detection data is received by the calculator 520 via another channel of the AD board as a wave-number clock signal which indicates a temporal change of the wave number. The wave-number clock signal is used to perform data conversion in the calculator 520 so that the optical spectrum interference data about a tomographic layer is converted into an interference signal at regular wave-number intervals. At that time, the data conversion is performed in such a manner that the number of pieces of the resulting data is 2048. Therefore, to obtain 2048 points or more at which the wave-number clock signal intersects a point of 0, the difference in optical path length between two arms of the Mach-Zehnder interferometer is set to 8 mm or more.

Part of light which is separated by an optical fiber coupler 502 is detected by a light detector 503, and is used to monitor a change in intensity of the light source 501. The intensity change information is also received by the calculator 520 via the AD board, and is used as an envelope of the optical spectral interference signal which is used to form a flat-top shape. By forming a flat-top shaped signal, an influence of the shape of the envelope of the original signal is suppressed, and shaping can be performed using a window function.

Data acquisition performed by the AD board is synchronized using a trigger signal 521 which is output from the wavelength-swept light source.

The interference signal that is converted into data at regular wave-number intervals is subjected to a Fast Fourier Transform, and a tomographic information signal along the optical axis along which irradiation with the measurement light is performed is obtained. The signal obtained through the Fourier transform includes a folding signal. Accordingly, one half of the signal obtained through the Fourier transform is extracted to be used as a tomographic information signal.

In an SS-OCT apparatus, the larger the difference in optical path length between the reference light path (i.e., the optical path from the optical fiber coupler 510, at which light is split the first time, to the optical fiber coupler 518, at which interference occurs after the light passes through the delay line, in the reference light path) and the measurement light path (i.e., the optical path from the optical fiber coupler 510, at which light is split the first time, to the optical fiber coupler 518, at which interference occurs after the measurement target is irradiated with light, in the measurement light path) is, the higher the frequency of the optical spectral interference signal is. In the configuration of the apparatus, when the difference in optical path length of approximately 8 mm is compared with that of 0 mm, the amplitude of the optical spectral interference signal for the former is one half that for the latter. Accordingly, before a tomographic image is obtained, the delay line (a distance between the optical fiber end 516 on the irradiating side and the optical fiber end 517 on the entering side) is adjusted so that the tomographic information signal corresponding to the topmost surface of the measurement target corresponds to approximately 0.

The angle of the galvanometer mirror 512 which is one of the galvanometer mirrors included in the measurement light scanning optical system is changed in 1024 directions, and a sequence of processes are performed as follows. An optical spectral interference signal is obtained for each of the directions; the optical spectral interference signal is converted into data at regular wave-number intervals; and a Fast Fourier Transform is performed on the resulting data. Light and shade in gray scale are produced on the basis of the intensity of the tomographic information signal for each of the directions of the galvanometer mirror 512, and the pieces of the tomographic information corresponding to the 1024 directions are arranged so that a tomographic image is obtained.

Further, by changing the angle of the galvanometer mirror 513, which is the other galvanometer mirror, in 1024 directions, three-dimensional volume tomographic layer data of 1024×1024×1024 can be finally obtained.

In FIG. 7, reference numerals 505 and 508 indicate fiber couplers in the Mach-Zehnder interferometer for generating a wave-number clock signal, and reference numerals 506 and 507 indicate collimator lenses. Reference numeral 509 indicates a differential light detector, and reference numerals 502 and 504 indicate fiber couplers.

The signal generation method of the present invention will be applied to improve the quality of a tomographic image.

The signal generation method of the present invention is applied to an obtained tomographic information signal corresponding to each of the directions.

The maximum of the peak intensities is detected for an obtained tomographic information signal corresponding to one direction.

Then, the amplitude, the phase, and the frequency of the optical spectral interference signal corresponding to the maximum of the peak intensities are calculated. The amplitude information is calculated from the magnitude of the detected peak value. The phase information is calculated from the real part and the imaginary part of the data obtained by performing a Fourier transform on the optical spectral interference signal. The frequency is calculated from the position of the detected peak. A sine wave signal is generated which extends along the wave-number space axis on the basis of the calculated information about the amplitude, the phase, and the frequency.

The optical spectral shape which was output from the light source at that time was a Gaussian function shape in which the maximum is present at the wave number 7496982.469 [m$^{-1}$] (corresponding to a wavelength of 838.1 [nm]) and in which the optical spectral intensity becomes one half the maximum at the wave number 7139983 [m$^{-1}$]

(corresponding to a wavelength of 880 [nm]) and at the wave number 7853982 [m$^{-1}$] (corresponding to a wavelength of 800 [nm]).

Accordingly, the sine wave is caused to extend from the wave number 8460395.981 [m$^{-1}$] (corresponding to a wavelength of 742.6585376 [nm]) to the wave number 6533568.956 [m$^{-1}$] (corresponding to a wavelength of 961.6773542 [nm]) at which the value of the Gaussian function falls down to 1/e$^2$ with respect to the maximum.

The generated sine wave signal is multiplied by a Gaussian function in which the maximum is present at the wave number 7496982.469 [m$^{-1}$] (corresponding to a wavelength of 838.1 [nm]) and in which the optical spectral intensity becomes one half the maximum at the wave number 7139983 [m$^{-1}$] (corresponding to a wavelength of 880 [nm]) and at the wave number 7853982 [m$^{-1}$] (corresponding to a wavelength of 800 [nm]), and an extrapolation signal is obtained.

A signal in the region smaller than the wave number 7139983 [m$^{-1}$] (corresponding to a wavelength of 880 [nm]) and a signal in the region larger than the wave number 7853982 [m$^{-1}$] (corresponding to a wavelength of 800 [nm]) are extracted from the extrapolation signal.

The extracted signals are added to the optical spectral interference signal, and a Fast Fourier Transform is further performed on the resulting signal.

The signal generation method is performed in each of all the directions of the galvanometer mirrors 512 and 513, improving the image quality of the three-dimensional volume tomographic layer data.

Second Embodiment

Figure 8:
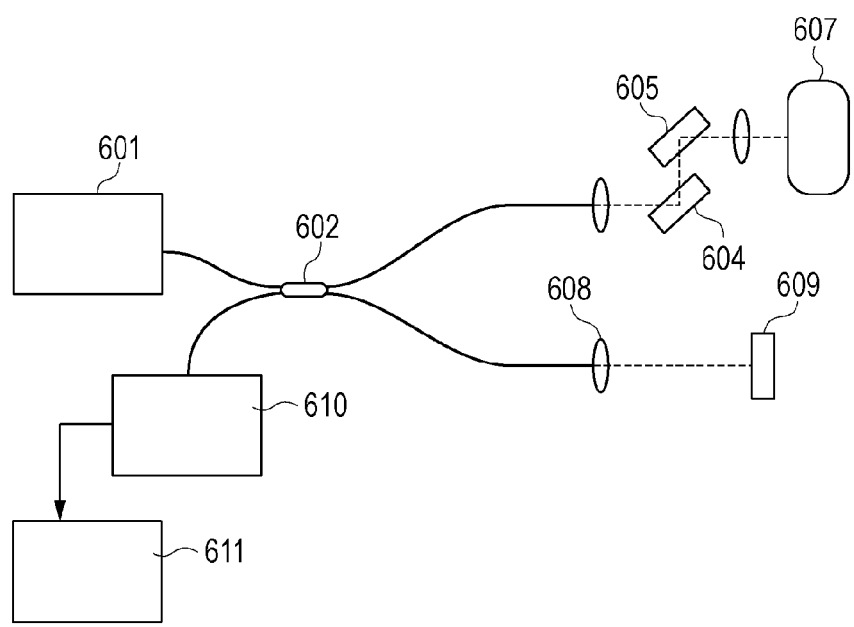
FIG. 8 is a schematic diagram of an optical coherence tomography imaging apparatus to which the present invention is applied.

FIG. 8 illustrates a schematic diagram illustrating a spectrum domain optical coherence tomography imaging apparatus (Spectral Domain—Optical Coherence Tomography: SD-OCT) according to the present embodiment. In FIG. 8, the configuration of the apparatus uses optical fibers. However, a configuration may be employed which uses space instead of optical fibers.

This SD-OCT apparatus uses a light source 601 which has a broad band of emission wavelength from 800 [nm] to 880 [nm]. A broadband LD (Super Luminescent Diode: SLD) is used as the light source. Alternatively, a super broadband continuum light (Super-continuum light source: SC light) or the like may be used.

In the SD-OCT apparatus, light which is output from the light source 601 is divided into two beams by an optical fiber coupler 602, and one of the divided beams is used as measurement light with which a measurement target 607 is irradiated. The scattered or reflected light from the measurement target 607 is again coupled into the optical fiber coupler 602. At that time, the measurement light passes through a measurement light scanning optical system which includes two galvanometer mirrors 604 and 605 which are orthogonal to each other. The measurement light scanning optical system scans the measurement target 607 with the measurement light.

In contrast, the other divided beam is used as reference light, and is propagated through a delay line in which a distance from an optical fiber end 608 to a mirror 609 can be changed. The mirror 609 is irradiated with the reference light in the delay line, and reflected reference light is also coupled into the optical fiber coupler 602 again.

Interference is caused between the scattered or reflected light and the reference light, and a spectroscope 610 obtains an optical spectral interference signal. The spectroscope is a line sensor array of 2048 pixels, and detects all the band of the light source output (800 to 880 [nm]). The detected optical spectral interference signal is received by a calculator 611 included in the image processor.

In the spectroscope 610, adjacent pixels detect light not at regular wave-number intervals but at regular wavelength intervals. Accordingly, data prepared in advance is used to convert the interference signal into data at regular wave-number intervals in the calculator 611.

The interference signal that is converted into data at regular wave-number intervals is subjected to a Fast Fourier Transform, and a tomographic information signal along the optical axis along which irradiation with the measurement light is performed is obtained. The signal obtained through the Fourier transform includes a folding signal. Accordingly, one half of the signal obtained through the Fourier transform is extracted to be used as a tomographic information signal.

In an SD-OCT apparatus, the larger the difference in optical path length between the reference light path (i.e., the optical path from the optical fiber coupler 602, which serves as a splitting point, to the mirror 609) and the measurement light path (i.e., the optical path from the optical fiber coupler 602, which serves as a splitting point, to the measurement target 607) is, the higher the frequency of the optical spectral interference signal is. In the configuration of the apparatus, when the difference in optical path length of approximately 8 mm is compared with that of 0 mm, the amplitude of the optical spectral interference signal for the former is one half that for the latter. Accordingly, before a tomographic image is obtained, the delay line (a distance between the optical fiber end 608 and the mirror 609) is adjusted so that the tomographic information signal corresponding to the topmost surface of the measurement target corresponds to approximately 0.

The angle of the galvanometer mirror 604 which is one of the galvanometer mirrors included in the measurement light scanning optical system is changed in 1024 directions, and a sequence of processes are performed as follows. An optical spectral interference signal is obtained for each of the directions; the optical spectral interference signal is converted into data at regular wave-number intervals; and a Fast Fourier Transform is performed on the resulting data. Light and shade in gray scale are produced on the basis of the intensity of the tomographic information signal for each of the directions of the galvanometer mirror 604, and the pieces of the tomographic information corresponding to the 1024 directions are arranged so that a tomographic image is obtained.

Further, by changing the angle of the galvanometer mirror 605, which is the other galvanometer mirror, in 1024 directions, three-dimensional volume tomographic layer data of 1024×1024×1024 can be finally obtained.

The signal generation method of the present invention will be applied to improve the quality of a tomographic image.

The signal generation method of the present invention is applied to an obtained tomographic information signal corresponding to each of the directions.

The maximum of the peak intensities is detected for an obtained tomographic information signal corresponding to one direction.

Then, the amplitude, the phase, and the frequency of the optical spectral interference signal corresponding to the maximum of the peak intensities are calculated. The amplitude information is calculated from the magnitude of the detected peak value. The phase information is calculated from the real part and the imaginary part of the data obtained by performing a Fourier transform on the optical spectral interference signal. The frequency is calculated from the position of the detected peak. A sine wave signal is generated which extends along the wave-number space axis on the basis of the calculated information about the amplitude, the phase, and the frequency.

The optical spectral shape which was output from the light source at that time was a Gaussian function shape in which the maximum is present at the wave number 7496982.469 [m$^{-1}$] (corresponding to a wavelength of 838.1 [nm]) and in which the optical spectral intensity becomes one half the maximum at the wave number 7139983 [m$^{-1}$] (corresponding to a wavelength of 880 [nm]) and at the wave number 7853982 [m$^{-1}$] (corresponding to a wavelength of 800 [nm]). Accordingly, the sine wave is caused to extend from the wave number 8460395.981 [m$^{-1}$] (corresponding to a wavelength of 742.6585376 [nm]) to the wave number 6533568.956 [m$^{-1}$] (corresponding to a wavelength of 961.6773542 [nm]) at which the value of the Gaussian function falls down to $1/e^2$ with respect to the maximum. The generated sine wave signal is multiplied by a Gaussian function in which the maximum is present at the wave number 7496982.469 [m$^{-1}$] (corresponding to a wavelength of 838.1 [nm]) and in which the optical spectral intensity becomes one half the maximum at the wave number 7139983 [m$^{-1}$] (corresponding to a wavelength of 880 [nm]) and at the wave number 7853982 [m$^{-1}$] (corresponding to a wavelength of 800 [nm]), and an extrapolation signal is obtained.

A signal in the region smaller than the wave number 7139983 [m$^{-1}$] (corresponding to a wavelength of 880 [nm]) and a signal in the region larger than the wave number 7853982 [m$^{-1}$] (corresponding to a wavelength of 800 [nm]) are extracted from the extrapolation signal.

The extracted signals are added to the optical spectral interference signal, and a Fast Fourier Transform is further performed on the resulting signal. The signal generation method is performed in each of all the directions of the galvanometer mirrors 604 and 605, improving the image quality of the three-dimensional volume tomographic layer data.

Third Embodiment

First, the image quality is improved by performing the signal processing described in the first embodiment. Subsequently, the second peak in descending order of peak intensity value is extracted, and the amplitude, the phase, and the frequency of the extracted peak are calculated.

Then, a sine wave is generated from the wave number 8460395.981 [m$^{-1}$] (corresponding to a wavelength of 742.6585376 [nm]) to the wave number 6533568.956 [m$^{-1}$] (corresponding to a wavelength of 961.6773542 [nm]) at which the value of the Gaussian function falls down to $1/e^2$ with respect to the maximum, on the basis of the amplitude, the phase, and the frequency which are calculated.

The sine wave signal is multiplied by a Gaussian function in which the maximum is present at the wave number 7496982.469 [m$^{-1}$] (corresponding to a wavelength of 838.1 [nm]) and in which the optical spectral intensity becomes one half the maximum at the wave number 7139983 [m$^{-1}$] (corresponding to a wavelength of 880 [nm]) and at the wave number 7853982 [m$^{-1}$] (corresponding to a wavelength of 800 [nm]), and an extrapolation signal is obtained.

A signal in the region smaller than the wave number 7139983 [m$^{-1}$] (corresponding to a wavelength of 880 [nm]) and a signal in the region larger than the wave number 7853982 [m$^{-1}$] (corresponding to a wavelength of 800 [nm]) are extracted from the extrapolation signal, and the extracted extrapolation signals are combined with the optical spectral interference signal.

The composite signal is subjected to a Fast Fourier Transform, and an improved tomographic information signal is obtained. In the case where N tomographic layers are present, these processes are further performed for the third to Nth peaks repeatedly.

The above-described signal processing achieves quality of the tomographic image higher than that according to the first embodiment.

In the case where the number of tomographic layers N is unknown, a signal may be generated with N being set to 100, in order to avoid infinite repetitions of computation. Alternatively, since the AD board used in the embodiment is a 12-bit type, a signal generation method may be employed in which the repetition is performed until the detected peak value reaches $10^{-3.6}$ ($\approx 2^{-12}$) Thus, the noise level can be reduced to $10^{-3.6}$ ($\approx 2^{-12}$).

Fourth Embodiment

Similarly to the first embodiment, a tomographic information signal is obtained.

Instead of detecting peaks one by one in the obtained tomographic information signal, a threshold is set, and the amplitude, the phase, and the frequency are calculated for each of the peaks which have a value equal to or more than the threshold.

For each of all the detected peaks, a sine wave is generated from the wave number 8460395.981 [m$^{-1}$] (corresponding to a wavelength of 742.6585376 [nm]) to the wave number 6533568.956 [m$^{-1}$] (corresponding to a wavelength of 961.6773542 [nm]) at which the value of the Gaussian function falls down to $1/e^2$ with respect to the maximum, on the basis of the amplitude, the phase, and the frequency which are calculated.

Each of all the sine wave signals is multiplied by a Gaussian function in which the maximum is present at the wave number 7496982.469 [m$^{-1}$] (corresponding to a wavelength of 838.1 [nm]) and in which the optical spectral intensity becomes one half the maximum at the wave number 7139983 [m$^{-1}$] (corresponding to a wavelength of 880 [nm]) and at the wave number 7853982 [m$^{-1}$] (corresponding to a wavelength of 800 [nm]), and an extrapolation signal is obtained by adding the multiplied sine wave signals.

A signal in the region smaller than the wave number 7139983 [m$^{-1}$] (corresponding to a wavelength of 880 [nm]) and a signal in the region larger than the wave number 7853982 [m$^{-1}$] (corresponding to a wavelength of 800 [nm]) are extracted from the extrapolation signal, and the extracted extrapolation signals are combined with the optical spectral interference signal. The composite signal is subjected to a Fast Fourier Transform, and a tomographic information signal is obtained.

Thus, the number of repetitions of the signal generation can be reduced, and the speed of improvement of a tomographic image can be increased.

The threshold may be defined as a value obtained through the following processes. The optical spectral intensity waveform which is output from the light source is obtained; the maximum and the second peak value are detected from the signal intensity obtained by performing a Fourier transform on the optical spectral intensity waveform; a ratio between the maximum peak value and the second peak value is calculated; and the maximum peak value of a tomographic information signal obtained by performing a Fourier transform on the optical spectral interference signal is multiplied by the ratio.

Fifth Embodiment

Similarly to the first or second embodiment, a tomographic information signal is obtained. In the obtained tomographic information signal, a threshold $T_m$ is defined as a value obtained by multiplying a range of reduction of 0.2 by the maximum peak value $P_0$ of the tomographic information signal obtained by performing the Fourier transform on the optical spectral interference signal, and $T_m$ is set to $P_0 \times 0.2^m$. The signal generation method in which the generation of an extrapolation signal, the combination, and the Fourier transform are collectively performed on the peaks which have a value equal to or more than the threshold $T_m$ is repeatedly performed with m being incremented by 1 from 0 to M, until the number of detected peaks reaches the number of tomographic layers N.

The range of reduction of 0.2 is determined in accordance with the ratio of 0.2 between the first peak value and the second peak value of the sinc function obtained by performing a Fourier transform on a rectangular wave.

In the case where the number of tomographic layers N is unknown, a signal may be generated with N being set to 100 in order to avoid infinite repetitions of the computation. Alternatively, a signal may be generated with the number of repetitions of calculation M being set to 100.

The signal generation method may be one in which repetitions are performed until the detected peak value reaches $10^{-3.6}$. Alternatively, the signal generation method may be one in which repetitions are performed until the threshold $T_m$ reaches $10^{-3.6}$. Thus, the noise level can be reduced to $10^{-3.6}$ ($\approx 2^{-12}$).

Instead of being 0.2, the range of reduction may be set to a ratio between the maximum peak value and the second peak value which are obtained by acquiring the optical spectral intensity waveform which is output from the light source, and detecting the maximum and second peak values of the signal intensity obtained by performing a Fourier transform on the optical spectral intensity waveform.

Sixth Embodiment

Similarly to the first or second embodiment, a tomographic information signal is obtained. To obtain the tomographic information signal, an optical spectral interference signal is multiplied by a window function which has the center of the wave number 7496982 [m$^{-1}$] (=a wavelength of 838.1 [nm]), and full width at half maximum of the wave number 713998.3 [m$^{-1}$] (the wave number 7853982 to 7139983 [m$^{-1}$]=a wavelength of 800 to 880 [nm]), so that the optical spectral interference signal is shaped. The window function may be a Gaussian function, the cos function, or a Hanning function. By multiplying the optical spectral interference signal by a window function so that the optical spectral interference signal is shaped, the information signal about a tomographic layer which is obtained through the Fourier transform is a signal which is unimodal and which has a low side noise level. In the case of a cos window or a Hanning window, an extrapolation signal is caused to extend to the wave number at which the value reaches 0 at a tail of the window function. Thus, the number of pieces of data can be limited, and increase in resolution and reduction in noise in an information signal can be performed at high speed. In the case where the window function is a Gaussian function, when an optical spectral interference signal is caused to extend in a finite range of the wave number, the value does not reach 0 at a tail of the window function. Therefore, the finite extended range of the wave number is set to a range in which a ratio between the maximum peak value and the second peak value of a waveform is $10^{-3.6}$ where the waveform is obtained by performing a Fourier transform on the window function in the finite extended range of the wave number. Thus, the number of pieces of data can be limited, and increase in resolution and reduction in noise in an information signal can be performed at high speed.

The optical spectral interference signal may be divided by spectral intensity information, which is otherwise obtained, so as to be shaped into a flat-top shape, and may be then multiplied by a window function so as to be shaped.

In the case where a window function is multiplied upon acquisition of an optical spectral interference signal, the same window function is also multiplied by the extrapolation signal.

By multiplying a window function so that the envelope of the optical spectral interference signal is shaped, a unimodal peak of the tomographic information signal is formed after the Fourier transform, enabling the quality of a tomographic image to be improved.

The present invention is not limited to the above-described embodiments. Various changes and modifications may be made without departing from the spirit and the scope of the present invention. The following claims are added to apprise the public of the scope of the present invention.

In the signal generation method of the present invention, an extrapolation signal is generated on the basis of a signal f(a) corresponding to the maximum peak intensity of an information signal F(b). The extrapolation signal is used to generate a composite signal, and the composite signal is further subjected to a Fourier transform.

That is, instead of using a wide range of data around a peak of the information signal, an amplitude, a phase, and a frequency which are indicated by the peak are used to generate an extrapolation signal so that a composite signal is generated, achieving a reduction of side noise accompanying the peak. Thus, an information signal which has a small peak intensity value and which is buried in side noise is not removed and remains, enabling a more detailed information signal to be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/080223, filed Dec. 27, 2011 which is hereby incorporated by reference herein in its entirety.

INDUSTRIAL APPLICABILITY

In various fields, such as an image processing field, various measurement fields, and an audio analysis field, the present invention is employable when various kinds of signals are generated by using a Fourier transform.

The invention claimed is:

1. A method executed by an optical coherence tomography imaging apparatus to reduce noise in a tomographic image, the method comprising:

acquiring a tomographic image based on an optical spectral interference signal output from a detector of the optical coherence tomography imaging apparatus when a light source irradiates a specimen; and processing the tomographic image with a processor to perform image processing steps comprising:

(a) obtaining a spectrum signal F(b) of a tomographic layer of the tomographic image by performing a Fourier transform on a signal f(a) of the optical spectral interference signal;

(b) detecting a maximum peak intensity of the spectrum signal F(b);

(c) calculating an amplitude, a phase, and a frequency of the signal f(a) by performing an inverse Fourier transform on the maximum peak intensity of the spectrum signal F(b);

(d) generating an extended signal f'(a) which extends along a wavenumber axis on the basis of the amplitude, the phase, and the frequency of the signal f(a);

(e) extracting from the extended signal f'(a) an extrapolation signal by multiplying the extended signal f' (a) with a window function such that the extrapolation signal has wavenumber values lower than a1 and greater than a2, where a1<a2;

(f) generating a composite signal by combining the extrapolation signal with the signal f(a) in a spatial frequency range from wavenumber values a1 to a2, wherein the wavenumber values from a1 to a2 correspond to a spectral band of the light source; and (g) performing a Fourier transform on the composite signal to generate a noise-reduced tomographic image.

2. The method according to claim 1,
wherein the spectrum signal F(b) includes a number N of peak intensities, and
wherein the processing steps (b) to (f) are repeatedly performed a number of N times in descending order of peak intensity values of the spectrum signal F(b), where N is an integer greater than 0.

3. The method according to claim 2,
wherein, among the number N of peak intensities, the number N indicates a number of peaks obtained by counting peaks from the maximum peak intensity to a peak intensity equal to or less than a predetermined threshold.

4. The method according to claim 1, further comprising the steps of:
determining a threshold for the maximum peak intensity of the spectrum signal F(b); and
repeating steps (b) to (f) in descending order of peak intensity values of the spectrum signal F(b) until a peak intensity value of the spectrum signal F(b) is equal to the threshold.

5. The method according to claim 4,
wherein, every time the peak intensity value of the spectrum signal F(b) decreases in the descending order, the threshold is reduced by using a predetermined ratio.

6. The method according to claim 4,
wherein the step of determining the threshold includes the steps of:
detecting the maximum peak intensity and a second peak intensity lower than the maximum peak intensity of the spectrum signal F(b) respectively corresponding to different tomographic layers; and
calculating a ratio between the second peak intensity and the maximum peak intensity, and wherein the threshold is set to a value obtained by multiplying the maximum peak intensity of the signal F(b) by the ratio.

7. The method according to claim 1,
wherein the signal f(a) of the optical spectral interference signal is multiplied by the window function in which a value at a tail of a waveform of the window function reaches 0, and
wherein the extended signal f'(a) is a signal extending to a point '$a_{ext,0}$' where a value of the window function reaches 0.

8. A signal processing apparatus configured to reduce noise in a tomographic image obtained by an optical coherence tomography imaging apparatus, the signal processing apparatus comprising:
an acquiring unit configured to acquire a tomographic image based on an optical spectral interference signal output from a detector of the optical coherence tomography imaging apparatus when a light source irradiates a specimen; and
a processor configured to process the tomographic image according to an image processing algorithm including processes to:

(a) obtain a spectrum signal F(b) of a tomographic layer of the tomographic image by performing a Fourier transform on a signal f(a) of the optical spectral interference signal;

(b) detect a maximum peak intensity of the spectrum signal F(b);

(c) calculate an amplitude, a phase, and a frequency of the signal f(a) by performing an inverse Fourier transform on the maximum peak intensity of the spectrum signal F(b);

(d) generate an extended signal f'(a) which extends along a wavenumber axis on the basis of the amplitude, the phase, and the frequency of the signal f(a);

(e) extract from the extended signal f'(a) an extrapolation signal by multiplying the extended signal f'(a) with a window function such that the extrapolation signal has wavenumber values lower than a1 and greater than a2, where a1<a2;

(f) generate a composite signal by combining the extrapolation signal with the signal f(a) in a spatial frequency range from wavenumber values a1 to a2, wherein the wavenumber values from a1 to a2 correspond to a spectral band of the light source; and (g) perform a Fourier transform on the composite signal to generate a noise-reduced tomographic image.

9. The signal processing apparatus according to claim 8,
wherein the spectrum signal F(b) includes a number N of peak intensities, and
wherein the processor is configured to process the tomographic image by repeating processes (b) to (f) a number of N times in descending order of peak intensity values of the spectrum signal F(b), where N is an integer greater than 0.

10. An optical coherence tomography imaging apparatus comprising:
the signal processing apparatus according to claim 8;
a light source unit;
a specimen measurement unit that irradiates a specimen with light from the light source unit and that conveys reflected light from the specimen;
a reference unit that conveys light from the light source unit as reference light;
an interference unit that causes interference between the reflected light and the reference light; and a light detector that detects interference light from the interference unit.

\* \* \* \* \*